(12) United States Patent
Lee

(10) Patent No.: US 6,882,391 B2
(45) Date of Patent: *Apr. 19, 2005

(54) METHOD OF FORMING A MULTI-DOMAIN HTN MODE LIQUID CRYSTAL DISPLAY DEVICE

(75) Inventor: Man Hoan Lee, Seoul (KR)

(73) Assignee: LG. Philips LCD Co., Ltd., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 10/684,676

(22) Filed: Oct. 15, 2003

(65) Prior Publication Data
US 2004/0135950 A1 Jul. 15, 2004

Related U.S. Application Data

(63) Continuation of application No. 09/957,538, filed on Sep. 21, 2001, now Pat. No. 6,671,021.

(30) Foreign Application Priority Data
Sep. 23, 2000 (KR) .................. 10-2000-55990

(51) Int. Cl.⁷ ............................. G02F 1/1337
(52) U.S. Cl. .................. 349/123; 349/129; 349/130
(58) Field of Search .................. 349/123, 128–130

(56) References Cited

U.S. PATENT DOCUMENTS

| | | | |
|---|---|---|---|
| 4,701,028 A | | 10/1987 | Clerc et al. |
| 4,786,147 A | | 11/1988 | Clerc et al. |
| 4,889,412 A | | 12/1989 | Clerc et al. |
| 4,896,947 A | * | 1/1990 | Leenhouts .................. 349/99 |
| 4,974,941 A | | 12/1990 | Gibbons et al. |
| 5,032,009 A | | 7/1991 | Gibbons et al. |
| 5,249,070 A | * | 9/1993 | Takano .................. 349/136 |
| 5,389,698 A | | 2/1995 | Chigrinov et al. |
| 5,464,669 A | | 11/1995 | Kang et al. |
| 5,473,455 A | | 12/1995 | Koike et al. |
| 5,477,358 A | | 12/1995 | Rosenblatt et al. |
| 5,504,604 A | | 4/1996 | Takatori et al. |
| 5,579,141 A | | 11/1996 | Suzuki et al. |
| 5,602,662 A | | 2/1997 | Rosenblatt et al. |
| 5,621,558 A | | 4/1997 | Shimada et al. |
| 5,757,454 A | | 5/1998 | Ogishima et al. |
| 5,757,455 A | | 5/1998 | Sugiyama et al. |
| 5,796,458 A | * | 8/1998 | Koike et al. .................. 349/126 |
| 6,091,471 A | | 7/2000 | Kim et al. |
| 6,141,074 A | | 10/2000 | Bos et al. |
| 6,154,266 A | | 11/2000 | Okamoto et al. |
| 6,184,961 B1 | * | 2/2001 | Ham .................. 349/141 |
| 6,300,993 B1 | | 10/2001 | Kuo et al. |
| 6,593,987 B1 | * | 7/2003 | Walton et al. .................. 349/129 |
| 2001/0024244 A1 | | 9/2001 | Son |

* cited by examiner

Primary Examiner—Tarifur R. Chowdhury
(74) Attorney, Agent, or Firm—McKenna Long & Aldridge LLP

(57) ABSTRACT

A homeotropic twisted nematic (HTN) mode LCD device is disclosed, which obtains a multi-domain, a wide viewing angle, and a rapid response time by applying photo-alignment to the HTN mode. The HTN mode LCD device includes first and second substrates, a first alignment film on the first substrate, the first alignment film having at least two domains and having a different alignment direction in the domain, a second alignment film on the second substrate, having the same alignment direction in the domain, and a liquid crystal layer between the first and second substrates.

35 Claims, 6 Drawing Sheets

METHOD OF FORMING A MULTI-DOMAIN HTN MODE LIQUID CRYSTAL DISPLAY DEVICE

This application is a continuation of U.S. patent application Ser. No. 09/957,538 filed Sep. 21, 2001 now U.S. Pat. No. 6,671,021.

This application claims the benefit of Korean patent Application No. 2000-55990 filed on Sep. 23, 2000, which is hereby incorporated by reference as if fully set forth herein.

BACKGROUND OF THE INVENTION

1. Field of the Invention

The present invention relates to a display device, and more particularly, to a homeotropic twisted nematic (HTN) mode LCD device that has multiple domains, a wide viewing angle, and a rapid response time by applying photo-alignment to the HTN mode.

2. Discussion of the Related Art

With rapid development of information communication fields, the importance of manufacturing display devices that display desired information is increasing.

A Cathode Ray Tube (CRT) is one of display devices can display various colors and has excellent screen brightness. CRTs have been mainly used for this purpose.

However, with the need for a portable display device having a large sized screen and high resolution, it has been necessary to develop a flat panel display to take the place of CRTs, which have great weight and volume. Such flat panel displays are widely used in monitors for computers, spacecraft, and aircraft.

Examples of flat panel displays include a liquid crystal display (LCD), an electroluminescent display (ELD), a field emission display (FED), and a plasma display panel (PDP).

To obtain an ideal flat panel display, lightweight, high luminance, high efficiency, high resolution, rapid response time, low driving voltage, low power consumption, low cost, and natural color display characteristics are required.

Among these flat panel displays, LCD devices having thin and small sizes have been developed to a point where they can perform as flat panel displays. Therefore, a demand for the LCD devices is consistently increasing.

A related art LCD device will be described in detail with reference to the accompanying drawings.

FIG. 1 is a sectional view showing an alignment direction of a liquid crystal in a mono-domain (single domain) homeotropic twisted nematic (HTN) mode LCD device.

FIG. 2 is a plan view showing the alignment direction of the liquid crystal in the related art mono-domain HTN mode LCD device.

Alignment films 13a and 13b are formed on two glass substrates 11a and 11b, and then the liquid crystal 15 is aligned perpendicular to the glass substrates between the glass substrates.

For reference, FIG. 2 shows the direction of the liquid crystal of upper substrate (an arrow of a solid line) and lower substrate (an arrow of a dotted line) on a panel.

In a general HTN mode, the initial alignment direction of the liquid crystal molecules is perpendicular to the glass substrate. At this time, if an external voltage is applied, the direction of the liquid crystal molecules varies with a direction perpendicular to an electric field induced by the applied voltage, thereby causing a twisted alignment structure in the liquid crystal.

A twist angle does not correspond exactly with an alignment angle. The twist angle can be adjusted according to a concentration of a chiral dopant added to the liquid crystal. However, adjustment of the twist angle is limited by the concentration of the chiral dopant. Accordingly, the viewing angle and color characteristic of the HTN mode LCD device is not better than that of a general twisted nematic (TN) mode LCD device. However, since the initial alignment direction of the liquid crystal molecules is perpendicular to the glass substrates, the rapid response time equivalent to that of a vertical alignment mode (VA mode) can be obtained.

FIG. 3 shows the alignment direction of the liquid crystal in a multi-domain LCD device using UV alignment.

In the multi-domain LCD device, the initial alignment direction of the liquid crystal molecules is parallel to the glass substrates. The alignment direction of an alignment film is adjusted by using ultraviolet rays, thereby obtaining the multi-domain. As shown in the drawing, the alignment directions of the liquid crystal molecules on the upper substrate in two adjacent domains correspond to each other. The alignment directions of the liquid crystal molecules on the lower substrate in two adjacent domains are different from each other. By irradiating UV rays using a mask, multiple domains, such as two domains and four domains, can be obtained. For reference, FIG. 3 shows two domains.

To obtain the alignment direction shown in FIG. 3, the upper and lower substrates are respectively irradiated with UV rays twice.

However, the related art LCD device has the following problems.

First, the mono-domain HTN mode LCD device obtains the rapid response time, however, a wide viewing angle cannot be achieved due to the twist angle of the liquid crystal molecules.

Moreover, the multi-domain LCD device using the UV alignment film can achieve a wide viewing angle, however, the response time is slow, and process steps of irradiating UV rays are repeatedly performed to obtain the multi-domain.

SUMMARY OF THE INVENTION

Accordingly, the present invention is directed to an HTN mode LCD device that substantially obviates one or more problems due to limitations and disadvantages of the related art.

An object of the present invention is to provide an HTN mode LCD device that obtains simultaneously a wide viewing angle of a multi-domain and a rapid response time of the HTN mode by applying a UV alignment film to the HTN mode.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an HTN mode LCD device includes first and second substrates, a first alignment film on the first substrate, the first alignment film having at least two domains and having a different alignment direction in the domain, a second alignment film on the second substrate, having the same alignment direction in the domain, and a liquid crystal layer between the first and second substrates, the liquid crystal layer having a twist angle of about 40 to 90 degrees and a tilt angle of about 80 to 90 degrees.

In another aspect of the present invention, an HTN mode LCD device is provided, which has a rapid response time of the HTN mode by applying the HTN mode to a UV alignment technique, and obtains multi-domain by applying the UV alignment technique.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
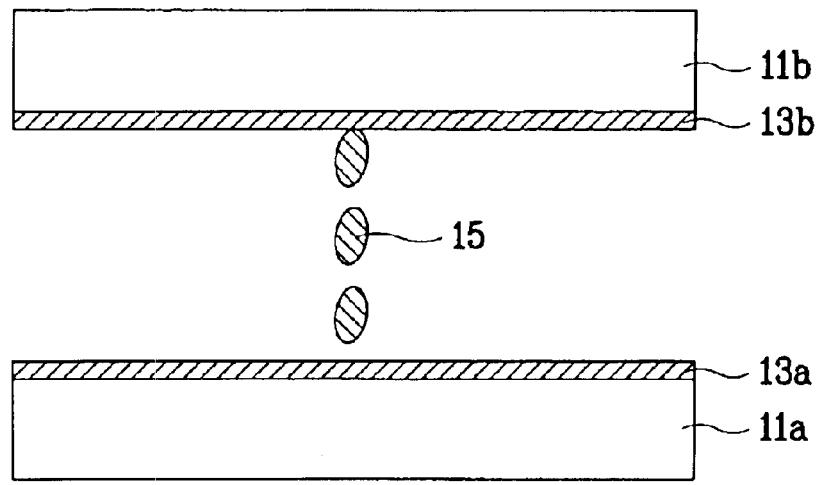
FIG. 1 is a sectional view showing an alignment direction of a liquid crystal molecules in a related art HTN mode LCD device.
Figure 2:
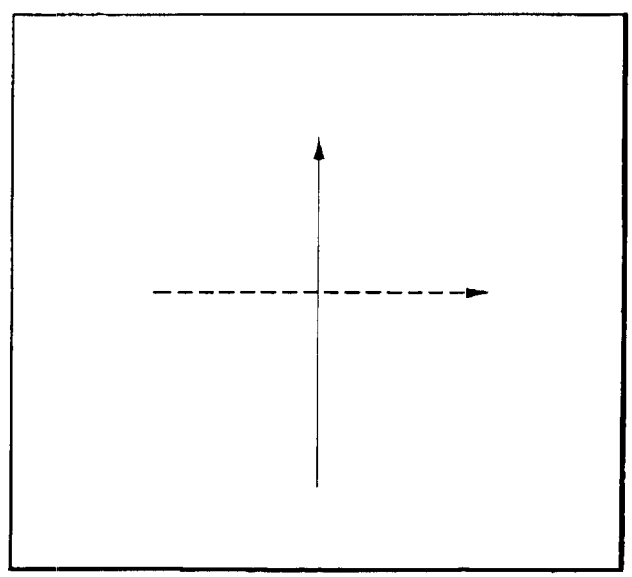
FIG. 2 is a plan view showing the alignment direction of the liquid crystal molecules in the related art HTN mode LCD device.
Figure 3:
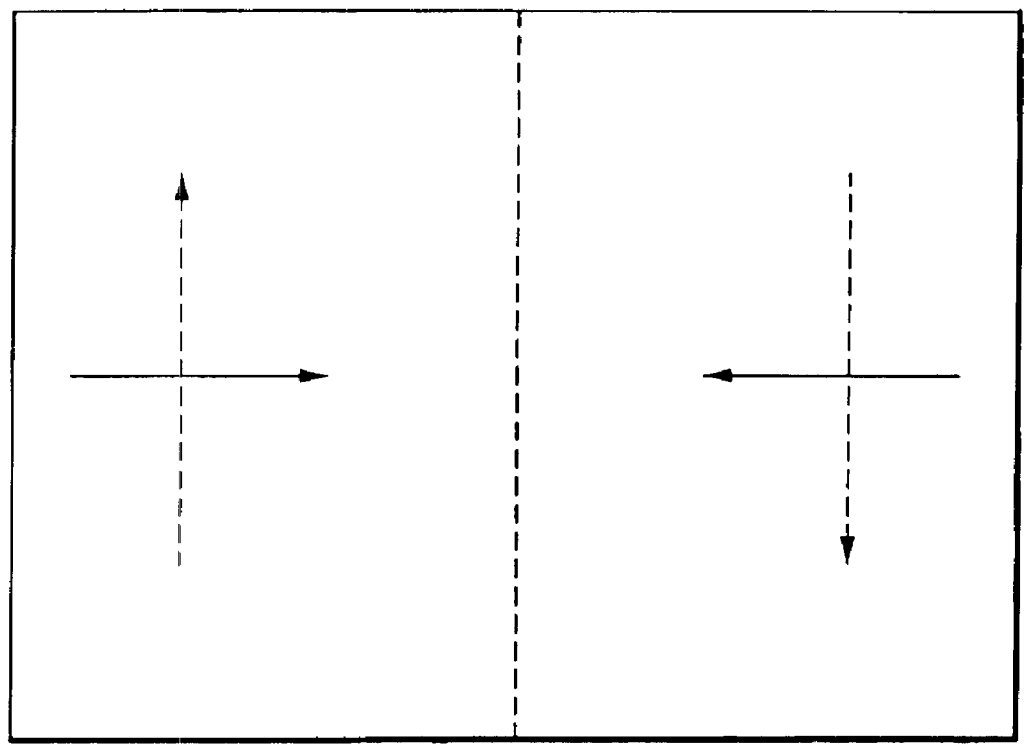
FIG. 3 is a plan view showing the alignment direction of the liquid crystal molecules in a multi-domain LCD device using a related art photo-alignment.
Figure 4:
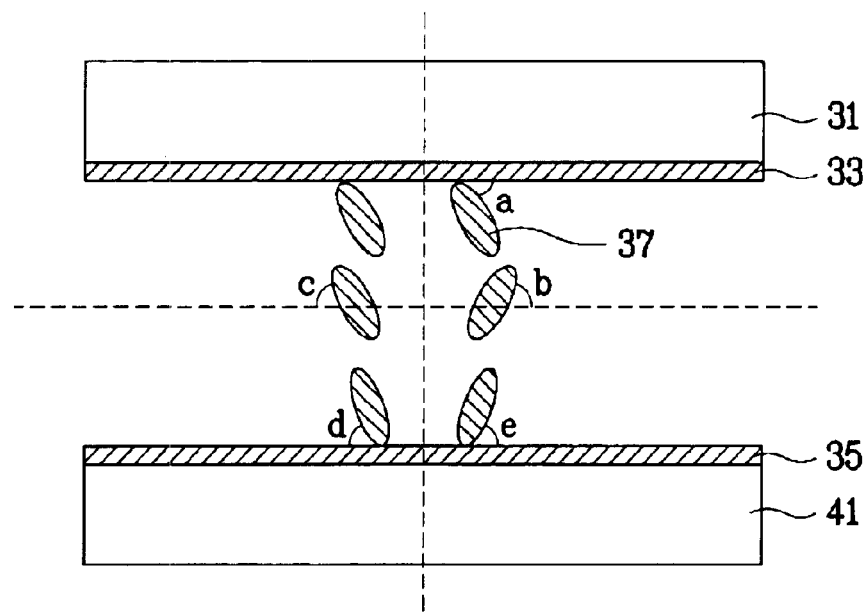
FIG. 4 is a sectional view showing the alignment direction of the liquid crystal molecules in the HTN mode LCD device of the present invention.

FIG. 4 shows an initial alignment direction of liquid crystal molecules according to an HTN mode LCD device of the present invention. FIG. 4 shows two domains, as an example.

As shown in FIG. 4, the HTN mode LCD device includes first and second substrates 31 and 41, first and second alignment films 33 and 35 formed respectively on the first and second substrates 31 and 41, and a liquid crystal 37 formed between the first and second alignment films 33 and 35.

At this time, both the first and second alignment films 33 and 35 may be formed of UV alignment films. Or, the second alignment film 35 may be formed of the photo-alignment film, and the first alignment film 33 may be formed of organic or inorganic alignment films.

In the HTN mode LCD device of the present invention, the alignment directions of the liquid crystal molecules at the first substrate 31, two adjacent domains correspond to each other, while the alignment directions of the liquid crystal molecules in the two adjacent domains are different from each other at the second substrate 41. At this time, a direction of the liquid crystal molecules in the middle layer between the first and second substrates 31 and 41 is influenced by the direction of the liquid crystal molecules adjacent to the second substrate 41. The direction of the liquid crystal molecules adjacent to the second substrate 41 is adjusted to control the direction of the liquid crystal molecules in the middle layer, thereby obtaining a wide viewing angle.

The process steps will be described in detail.

Figure 5:
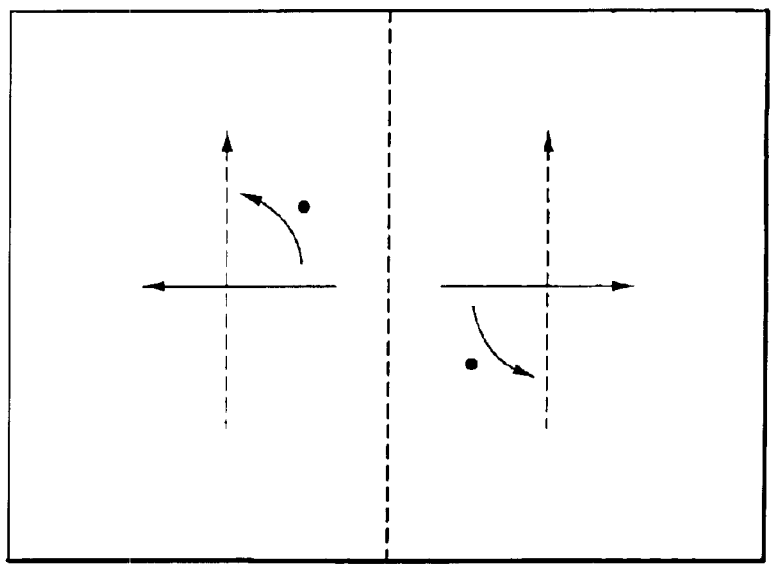
FIG. 5 is a plan view showing the alignment direction of the liquid crystal molecules within an adjacent domain according to the HTN mode LCD device of the present invention.

In an alignment structure of FIG. 4, when using the liquid crystal for vertical alignment, a right-handed chiral dopant is added. If a voltage is applied, the liquid crystal molecules are twisted in the direction indicated by an arrow shown within a domain of FIG. 5. That is, the twist directions of the liquid crystal molecules are correspondingly diagonal in two domains (toward black dots), so that the viewing angle is compensated, thereby obtaining the wide viewing angle.

If the right-handed chiral dopant is not added for vertical alignment of the liquid crystal molecules, the alignment direction of the liquid crystal molecules in any one domain is formed to the left, so that the viewing angle cannot be compensated.

As shown in FIG. 4, when a specific voltage is applied, the liquid crystal molecules are aligned so that tilt angles of the liquid crystal are spatially similar in the two domains, while the twist angles are different in the middle layer of the liquid crystal.

A detailed method for obtaining the rapid response time and the wide viewing angle in the HTN mode LCD device of the present invention will be described.

In a method for adjusting a twist angle of a liquid crystal when a voltage is applied to an HTN mode LCD device, a twist angle is adjusted, so that a wide viewing angle and a rapid response time can be obtained even though it is the HTN mode.

In order to adjust the twist angle of the liquid crystal molecules, a concentration of a dopant added to the liquid crystal is adjusted, and an alignment angle between first and second substrates is adjusted so that the twist angle and direction of the liquid crystal can be adjusted. The twist angle of the liquid crystal of the present invention is adjusted to an angle of about 40 to 90 degrees (preferably at the angle of about 70 to 90 degrees).

In the general TN mode that the liquid crystal molecules are aligned parallel to the substrates. In such TN construction, the twist angle is small, which is advantageous to the viewing angle. Therefore, the alignment angle is usually reduced. However, in the HTN mode LCD device of the present invention, the alignment angle is increased to increase the twist angle. At this time, the twist angle is appropriately adjusted considering reliability of the alignment.

A method for adjusting a twist angle of a liquid crystal in the middle layer is provided in such a manner that the twist angle of the liquid crystal molecules in the middle layer is adjusted, thereby obtaining a wide viewing angle. At this time, a tilt angle of the liquid crystal molecules on a lower substrate is adjusted to control the tilt angle of the liquid crystal molecules in the middle layer.

In FIG. 4, angles "c" and "b" of the liquid crystal molecules in the middle layer are controlled by adjusting angles "d" and "e" of the liquid crystal molecules adjacent to the second substrate 41. The liquid crystals in the middle layer are influenced by movement of the liquid crystals adjacent to the second substrate 41. Accordingly, to obtain the wide viewing angles "d" and "e" of the liquid crystal molecules adjacent to the second substrate 41 are adjusted in such a way that the tilt angles of the liquid crystal molecules in the middle layer are similar to the tilt angles of the liquid crystal molecules adjacent to the first substrate 31.

If the angles "d" and "e" are about 80 degrees or less, light leaks in a black state according to a characteristic of a parallel alignment. Therefore, in another embodiment of the present invention, the tilt angles of the liquid crystal molecules in the middle layer are about 80 degrees or more (preferably, between about 80 degrees and about 90 degrees).

When a voltage is applied to a liquid crystal, surface anchoring energy of the liquid crystal molecules and bulk force of the liquid crystal molecules attract each other. At this time, if the anchoring energy is powerful, movement of liquid crystal molecules is relatively weak.

Unlike general TN mode devices, an HTN mode LCD device has a twisted structure if voltage is applied. Therefore, as the anchoring energy is more powerful, the twist angle is smaller. Accordingly, a photo-alignment film having weak anchoring energy is used in the HTN mode LCD device of the present invention, so that the twist angle of the liquid crystal molecules is increased when the voltage is applied. The increased twist angle is appropriate to a structure of the HTN structure.

The aforementioned three methods are applied to the HTN mode LCD device of the present invention, in which the twist and tilt angles of the liquid crystal molecules are adjusted, and wide viewing angle is obtained in the HTN mode LCD device by using the alignment film having the weak anchoring energy. Also, a process for obtaining the wide viewing angle is simplified by using photo-alignment film as the alignment film.

At this time, the photo-alignment film can be simultaneously formed on the first and second substrates, or only on the second substrate. As shown in FIG. 4, the alignment direction of the liquid crystal in two adjacent domains correspond to each other. Therefore, the process for irradiating UV rays is performed 3 times: once on the first substrate and twice on the second substrate, if the first and second substrates 31 and 41 are simultaneously formed. The light includes non-polarized light, unpolarized light, linearly polarized light or partially polarized light.

In a case where the photo-alignment film is only formed on the second substrate, polyimide is deposited on the first substrate and rubbed, and then only the second substrate is irradiated with UV rays at least twice.

Figure 6:
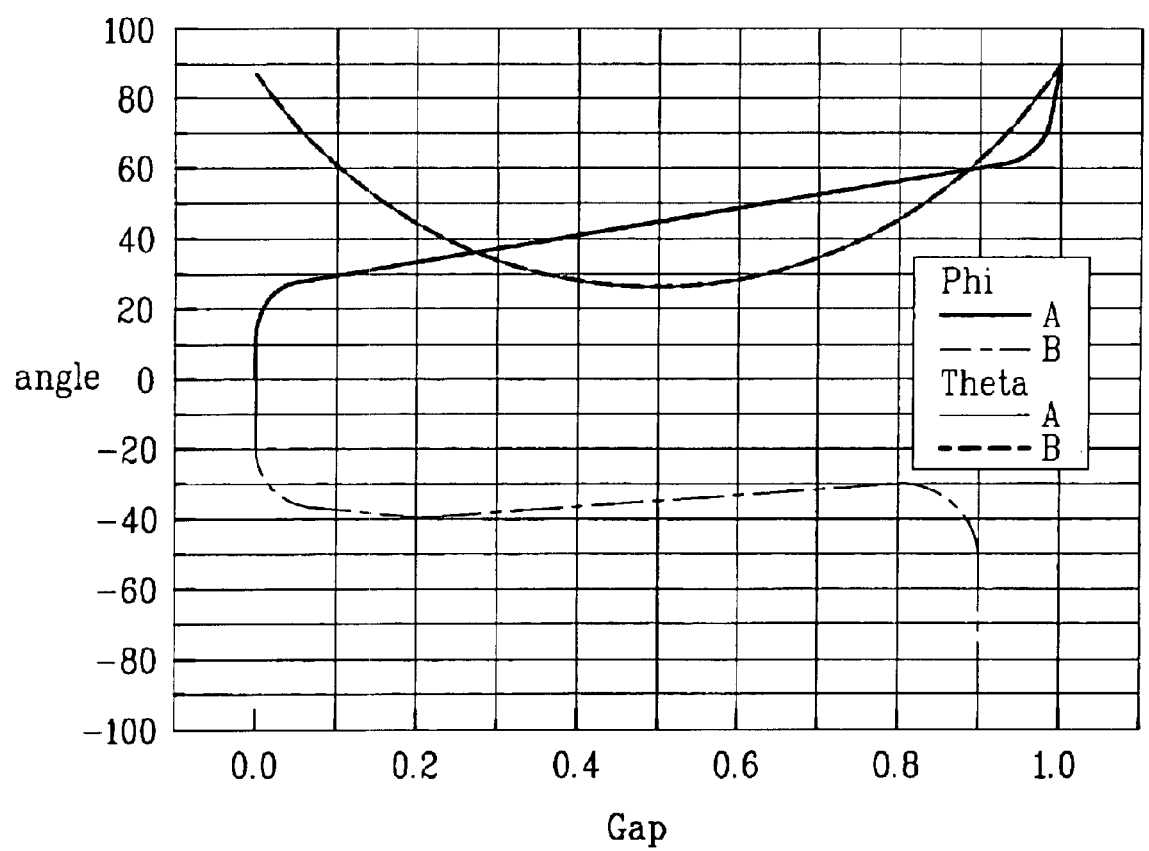
FIG. 6 is a graph showing changes of a twist angle and a tilt angle depending on a cell gap according to the HTN mode LCD device of the present invention.

For reference, FIG. 6 shows the twist (Phi) and tilt (Theta) angles according to a cell gap of an HTN mode LCD device of the present invention. "A" is an angle of domain-1, and "B" is an angle of domain-2.

In FIG. 6, it is shown there is a portion that "A", the tilt angle of domain-1, corresponds to "B", the tilt angle of domain-2.

Figure 7:
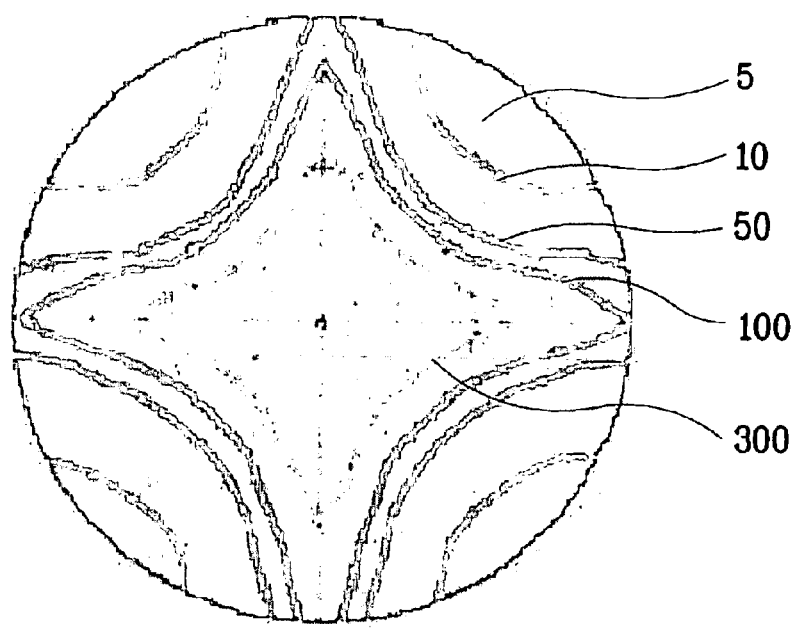
FIG. 7 is an iso-contrast curve according to the HTN mode LCD device of the present invention.
Figure 8:
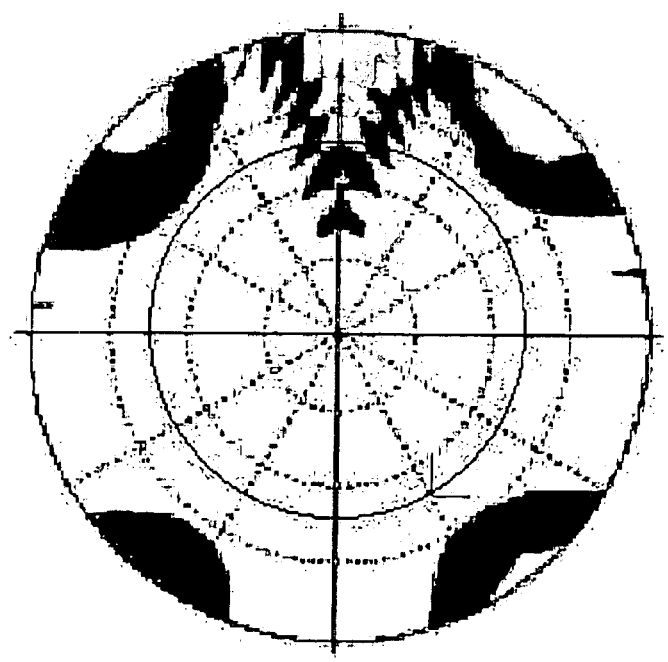
FIG. 8 shows a gray inversion region according to the HTN mode LCD device of the present invention.

FIG. 7 shows an iso-contrast curve according to the HTN mode LCD device of the present invention. In the iso-contrast curve, good contrast characteristic is shown based on a contrast value of "10". FIG. 8 shows a gray inversion region according to the HTN mode LCD device of the present invention, in which the gray inversion regions are not generated except in upper regions in the middle.

Figure 9:
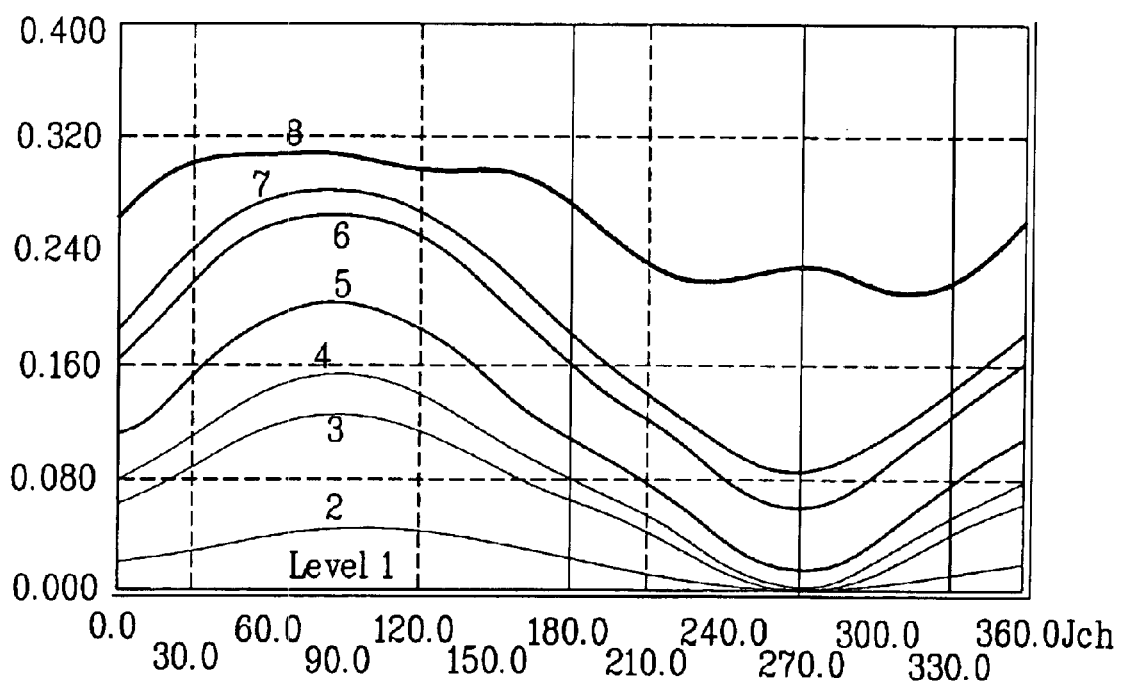
FIG. 9 shows luminance depending on an angle of each gray level according to the HTN mode LCD device of the present invention.

FIG. 9 shows the respective luminance depending on gray level according to the HTN mode LCD device of the present invention. It is noted eight levels are almost equivalent. It is also noted that the luminance of an upper level is not mostly overlapped with the luminance of a lower level.

As aforementioned, the LCD device of the present invention has the following advantages.

First, in the LCD device of the present invention, the rapid response time of the HTN mode can be obtained. Also, the wide viewing angle can be obtained by adjusting the tilt and twist angles of the liquid crystal and by using the alignment film having low anchoring energy.

Furthermore, in the LCD device of the present invention, photo-alignment is used, so that the process of irradiating light can be reduced by once or twice. Therefore, the process is simplified.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of forming a homeotropic twisted nematic mode liquid crystal display (LCD) device, comprising:
    forming a first alignment film on a first substrate, the first alignment film having at least two domains having different alignment directions in each of the two domains;
    forming a second alignment film on a second substrate, the second alignment film having at least two domains having the same alignment direction in all of the domains; and
    disposing a liquid crystal layer between the first and second substrates, the liquid crystal layer having a twist angle of about 40 to 90 degrees and a tilt angle of about 80 to 90 degrees.

2. The method of claim 1, wherein the first alignment film has a low anchoring energy.

3. The method of claim 1, wherein at least one of the first and second alignment films includes a photo-alignment film.

4. The method of claim 1, wherein the first alignment film includes a photo-alignment film.

5. The method of claim 1, wherein second alignment film includes an organic film.

6. The method of claim 1, wherein the second alignment film is rubbed.

7. The method of claim 1, wherein the second alignment film includes an inorganic film.

8. The method of claim 7, wherein the second alignment film is rubbed.

9. The method of claim 9, wherein the first alignment film is irradiated with light.

10. The method of claim 1, wherein the first alignment film is irradiated at least twice with light.

11. The method of claim 1, wherein the tilt angle is controlled by adjusting an alignment direction of the liquid crystal layer.

12. The method of claim 1, wherein the liquid crystal layer includes a chiral dopant.

13. The method of claim 12, wherein the twist angle is controlled by adjusting a type of chiral dopant.

14. The method of claim 12, wherein the twist angle is controlled by adjusting a concentration of chiral dopant.

15. The method of claim 1, wherein the tilt angle is greater than 80 degrees.

16. The method of claim 1, wherein the twist angle is greater than 40 degrees.

17. A method of forming a homeotropic twisted nematic mode liquid crystal display (LCD) device, comprising:

forming a first alignment film on a first substrate, the first alignment film having at least two domains having different alignment direction in each of the two domains;

forming a second alignment film on a second substrate, the second alignment film having at least two domains having the same alignment direction in all of the domains; and disposing a liquid crystal layer between the first and second substrates.

18. The method of claim 17, wherein the first alignment film has a low anchoring energy.

19. The method of claim 17, wherein at least one of the first and second alignment films includes a photo-alignment film.

20. The method of claim 17, wherein the first alignment film includes a photo-alignment film.

21. The method of claim 20, wherein the first alignment film is irradiated with light.

22. The method of claim 21, wherein the first alignment film is irradiated at least twice with light.

23. The method of claim 17, wherein the second alignment film is an organic film.

24. The method of claim 23, wherein the second alignment film is rubbed.

25. The method of claim 17, wherein the second alignment film is an inorganic film.

26. The method of claim 25, wherein the second alignment film is rubbed.

27. The method of claim 17, wherein a tilt angle is controlled by adjusting an alignment direction of the liquid crystal layer.

28. The method of claim 17, wherein the liquid crystal layer includes a chiral dopant.

29. The method of claim 28, wherein a twist angle is controlled by adjusting a type of the chiral dopant.

30. The method of claim 28, wherein a twist angle is controlled by adjusting a concentration of the chiral dopant.

31. The method of claim 28, wherein a twist angle of about 40 to 90 degrees.

32. The method of claim 28, wherein a tilt angle of about 80 to 90 degrees.

33. A method of forming a homeotropic twisted nematic mode liquid crystal display (LCD) device, comprising:

forming a first alignment film on a first substrate, the first alignment film having at least two domains having different alignment direction in each of the two domains;

forming a second alignment film on a second substrate, the second alignment film having at least two domains having the same alignment direction in all of the domains; and disposing a liquid crystal layer between the first and second substrates, the liquid crystal layer having a twist angle of about 40 to 90 degrees and a tilt angle of about 80 to 90 degrees;

wherein at least one of the first and second alignment films is a photo-alignment film.

34. The method of claim 33, wherein the twist angle is greater than 40 degrees.

35. The method of claim 33, wherein the tilt angle is greater than 80 degrees.

* * * * *